Patented Mar. 9, 1926.

1,575,634

UNITED STATES PATENT OFFICE.

THOR MEJDELL, OF SKOIEN, NEAR CHRISTIANIA, AND ÖYSTEIN RAVNER, OF CHRISTIANIA, NORWAY, ASSIGNORS TO NORSK HYDRO-ELEKTRISK KVAELSTOFAKTIESELSKAB, OF CHRISTIANIA, NORWAY.

PROCESS OF PURIFYING ALUMINUM NITRATE.

No Drawing. Application filed February 27, 1922. Serial No. 539,696.

*To all whom it may concern:*

Be it known that we, THOR MEJDELL, and ÖYSTEIN RAVNER, citizens of the Kingdom of Norway, residing at Skoien, near Christiania, and Suhmsgate 2, Christiania, Norway, have invented certain new and useful Improvements in Processes of Purifying Aluminum Nitrate, of which the following is a specification.

This invention relates to the production of iron-free aluminum nitrate.

The raw materials employed for the commercial production of aluminum nitrate contain iron, and unless some special procedure is resorted to the aluminum nitrate produced therefrom will contain iron. For instance, if aluminum nitrate is crystallized directly from solutions obtained by dissolving aluminiferous minerals and industrial products in nitric acid, the salt will be contaminated with iron.

Users of aluminum nitrate demand a product free of iron.

Heretofore it has been attempted to precipitate iron from crude solutions of aluminum nitrate prior to the crystallization of the salt but this involves many difficulties.

The present inventors have now found that it is possible to crystallize iron-free aluminum nitrate from solutions of aluminum nitrate containing iron if the stoicheiometric relation between the acids and bases in the solutions is less than 1 and the solutions are not sufficiently basic to precipitate the iron. Even by this method it is impossible to prevent some of the soluble iron combinations in the solution from sticking to crystals of aluminum nitrate precipitated therefrom in the ordinary way. A better result is obtained if the crystallization is carried out in such a way that each single crystal is formed in free suspension in the solution and washed on all sides during the formation thereof. To this end the deposition of the crystals upon a cooled wall as is usually the case in present practice must be avoided. This may be done by cooling the heated solution from which salt is to be crystallized by mixing it with a cool solution. If for instance a hot, saturated solution of aluminum nitrate is allowed to run down into a cold saturated solution of aluminum nitrate, either in the form of a thin stream or in drops, the temperature of the system will fall so that aluminum nitrate crystals must be precipitated. These crystals formed in suspension in the liquid will move about freely and will grow in size, surrounded by liquid, until they reach a size at which they will sink to the bottom of the body of liquid. The rate at which the crystals sink through the liquid depends upon the viscosity and movement of the liquid and by variation of these two factors the size of the crystals may be controlled.

Crystals produced in this way contain considerably less iron than crystals formed in the usual way.

As the crystallization proceeds the solution becomes more and more basic, and in order to avoid the precipitation of iron, due to excessive basicity, the crystallization is stopped at a suitable point and the solution added to a fresh nitrate solution or used for dissolving nitrate to be purified by recrystallation.

We claim:

1. Process of separating aluminum nitrate from iron compounds comprising mixing a hot solution of aluminum nitrate with a relatively cold solution of aluminum nitrate, at least one of said solutions containing an iron compound, said solutions being sufficiently concentrated and at such temperatures that aluminum nitrate crystallizes from the mixture.

2. Process as defined in claim 1 in which the hot solution of aluminum nitrate and the relatively cold solution of aluminum nitrate are mixed by flowing the former in the form of a fine stream or drops into a body of the latter.

3. Process as defined in claim 1 in which at least one of said solutions is sufficiently basic to give a basic mixture which is not sufficiently basic to precipitate iron.

4. Process as defined in claim 1 in which the hot solution of aluminum nitrate is substantially saturated and contains an iron compound and is sufficiently basic to give with the relatively cold solution of aluminum nitrate a basic mixture which is not sufficiently basic to precipitate iron and in which the solutions are mixed by flowing said hot solution in the form of a fine stream or drops into said relatively cold solution.

In testimony whereof, we affix our signatures.

THOR MEJDELL.
ÖYSTEIN RAVNER.